(12) United States Patent
Wisse

(10) Patent No.: US 8,606,741 B2
(45) Date of Patent: Dec. 10, 2013

(54) AUTOMATED FILLING OF CONDITIONAL PROBABILITY DATA IN A DECISION SUPPORT APPARATUS THAT USES A BAYESIAN BELIEF NETWORK

(75) Inventor: Bram Willem Wisse, Utrecht (NL)

(73) Assignee: Nederlandse Organisatie voor Toegepast-Natuurwetenschappelijk Onderzoek Tno, Delft (NL)

( * ) Notice: Subject to any disclaimer, the term of this patent is extended or adjusted under 35 U.S.C. 154(b) by 289 days.

(21) Appl. No.: 12/934,951

(22) PCT Filed: Mar. 27, 2009

(86) PCT No.: PCT/NL2009/050156
§ 371 (c)(1),
(2), (4) Date: Dec. 13, 2010

(87) PCT Pub. No.: WO2009/120083
PCT Pub. Date: Oct. 1, 2009

(65) Prior Publication Data
US 2011/0093428 A1 Apr. 21, 2011

(30) Foreign Application Priority Data

Mar. 28, 2008 (EP) .................................. 08153609
Jun. 23, 2008 (EP) .................................. 08158809
Nov. 28, 2008 (EP) .................................. 08170272

(51) Int. Cl.
*G06N 5/02* (2006.01)
(52) U.S. Cl.
USPC ........................................................ 706/52
(58) Field of Classification Search
USPC ........................................................ 706/52
See application file for complete search history.

(56) References Cited

U.S. PATENT DOCUMENTS

| | | | |
|---|---|---|---|
| 2008/0177679 A1* | 7/2008 | Cox et al. ......................... | 706/11 |
| 2009/0006305 A1* | 1/2009 | Cox et al. ......................... | 706/52 |
| 2009/0070279 A1* | 3/2009 | Rajabally ........................ | 706/12 |
| 2009/0125378 A1* | 5/2009 | Trahan et al. .................... | 705/10 |

OTHER PUBLICATIONS

Druzdzel, M.J. et al., Elicitation of probabilities for belief networks: combining qualitative and quantitative information, Proceedings of the 11th Conference on Uncertainty in Artificial Intelligence (UAI '95), Aug. 18-20, 1995, pp. 141-148.

(Continued)

*Primary Examiner* — Kakali Chaki
*Assistant Examiner* — Michael Zidanic
(74) *Attorney, Agent, or Firm* — Knobbe, Martens, Olson & Bear, LLP

(57) ABSTRACT

A computer implemented method is provided to expand a limited amount of input to conditional probability data filling a Bayesian Belief network based decision support apparatus. The conditional probability data defines conditional probabilities of states of a particular network node as a function of vectors of state values of a set of parent nodes of the particular network node in the Bayesian Belief network. The computer implemented method comprises receiving elicited conditional probability data that defines the conditional probabilities of the state values of the particular network node for a subset of all possible vectors of combinations of state values of the parent nodes. Conditional probability data defining the conditional probabilities of the state values of the particular network node for further possible vectors of state values of the parent nodes is interpolated from the elicited conditional probability data. The influence factors are determined.

17 Claims, 10 Drawing Sheets

(56) References Cited

OTHER PUBLICATIONS

Fenton, N.E. et al., Bayesian belief network model for the safety assessment of nuclear computer-based systems, Esprit Project No. 20072: Design for Validation (DeVa), Technical Report, 1997, Issue 52.

Fenton, N.E. et al., Using ranked nodes to model qualitative judgments in Bayesian networks, IEEE Transactions of Knowledge and Data Engineering, May 29, 2007, vol. 19, Issue 10, pp. 1420-1432.

International Search Report dated May 18, 2009, for International Application No. PCT/NL2009/050156.

Littlewood, B. et al., Examination of Bayesian belief network for safety assessment of nuclear computer-based systems, Esprit Project No. 20072: Design for Validation (DeVa), Technical Report, Sep. 29, 1998, Issue 70.

Tang, Z. et al., Developing complete conditional probability tables from fractional data for Bayesian Belief Networks, Journal of Computing in Civil Engineering, Jul. 1, 2007, vol. 21, Issue 4, pp. 265-276.

Wellman, M.P., Fundamental concepts of qualitative probabilistic networks, Artificial Intelligence, Aug. 1990, vol. 44, Issue 3, pp. 257-303.

Wisse, B.W. et al., Relieving the elicitation burden of Bayesian belief networks, Proceedings of the 6th Bayesian Modelling Applications Workshop (BMAW '08), Jul. 9, 2008.

* cited by examiner

AUTOMATED FILLING OF CONDITIONAL PROBABILITY DATA IN A DECISION SUPPORT APPARATUS THAT USES A BAYESIAN BELIEF NETWORK

This application is the U.S. National Phase of International Application No. PCT/NL2009/050156, filed Mar. 27, 2009, designating the U.S. and published in English as WO 2009/120083 on Oct. 1, 2009 which claims the benefit of European Patent Application Nos. 08153609.6 filed Mar. 28, 2008, 08158809.7 filed Jun. 23, 2008 and 08170272.2 filed Nov. 28, 2008.

FIELD OF INVENTION

This invention relates to a decision support apparatus that uses a Bayesian belief network and to a method and an apparatus for computer aided elicitation of conditional probabilities for use in a Bayesian belief network of such a decision support apparatus.

BACKGROUND

Computer based decision support based on Bayesian belief networks (BBNs) has been performed ever since the introduction of BBNs in the 1980s by Kim and Pearl (1983), and has found widespread use in the support of decision making.

A BBN is a known data structure to represent and reason with uncertainty in decision making processes. A BBN represents a directed a-cyclic graph (the network) consisting of nodes and arcs. The nodes represent variables $X_c$ and the arcs the dependencies between the variables. An arc from a node A to a node B means that the probability of occurrence of the states of node B depends on the state of node A. In this case A is referred to as predecessor or parent of node B, and B in its turn as descendent or child of node A. The BBN makes it possible to compute the joint probability distribution for all the variables (nodes) in the belief network. This is done by determining for each variable $X_c$ its conditional probability distribution, where the conditioning variables—if any—are the variables of its parent nodes. These variables may be denoted with $pa(X_c)$. The full joint probability distribution for all the variables in the network, $P(X_1, \ldots, X_n)$, can then be derived as $$P(X_1, \ldots, X_n) = \prod_{c=1}^{n} P(X_c \mid pa(X_c)).$$

Before it can be used, the BBN has to be constructed. This means that the variables of the belief network and their discrete states (the values that these variables may assume) must be defined, as well as the dependencies between the variables and the conditional probabilities. Known methods involve posing questions to experts to determine these parameters. The process of posing questions to experts to collect data is referred to as elicitation.

The elicitation task is considered a major obstacle in the use of BBNs. For a BNN of a realistic problem, quantification of its probabilities requires a formidable amount of work from experts. The number of probabilities that need to be specified for a node can grow large very easily. For a node with three states that has a parent node with also three states, 6 probabilities need to be specified to determine its conditional probability table (CPT). An additional second and third parent node with three states would consequently require a table of 18 and 54 probabilities, and so on with exponential growth. For many applications these probabilities need to be specified subjectively by experts. Apart from the huge amounts of time it would take to assess all the probabilities for large CPTs, it can also be questioned to what extent assessors can be expected to coherently provide the probabilities at the level of detail required.

In order to reduce this obstacle it is desirable to provide for a separation of elicitation in steps with expert involvement and automated steps that can be performed by a machine without expert involvement. In this case the obstacle is formed by the steps that require expert involvement. By improving the machine steps this obstacle can be reduced.

Tang and McCabe (2007) disclose an approach to reduce the number of assessments to be made by experts. In this approach it is assumed that each state variable can assume only two values, which may be called positive and negative. Tang and McCabe (2007) propose to identify "dominant" state values of parent nodes. When a parent node has a dominant state value, the probability of the child node is not affected by the state values of the other parent nodes. This identification enabled the elimination of about half the elicitation task, but left a substantial amount of expert involvement for cases when there was no dominant state value or the state of the relevant parent node did assume its dominant state value.

Absent a dominant state value, Tang and McCabe proposed to use interpolation to supply part of the conditional probabilities without expert input. The expert is asked to identify a set of "most favorable" state values of the parent nodes of a current node that results in a highest probability of a positive state value of the current node. The expert is also asked to supply a value of the probability in this case and a probability in the case wherein the variables of all parent nodes assume the opposite of the most favorable state values. Subsequently, the conditional probabilities for other sets of state values of the parent nodes are determined by interpolation between these probabilities, using the number of parent nodes that have most favorable state values to determine the relative weights of these probabilities in the interpolation.

Furthermore, Tang and McCabe propose a refinement of this method, wherein the experts are asked to provide additional conditional probabilities for a limited number of selected sets of state values of the parent nodes with different numbers of parent nodes that have most favorable state values. In this case piecewise linear interpolation between these additional conditional probabilities is used. In a further refinement, it is detected whether significant discrepancies occur between conditional probabilities provided by experts for selected sets of state values of the parent nodes with the same numbers of parent nodes that have most favorable state values. In this case, the experts are asked to provide more conditional probabilities.

However, the methods of Tang and McCabe work only in the case of binary variables. In the case of two possible state values for a node, the probability of one state value is simply one minus the probability of the other. Tang and McCabe do not account for the distribution of probability over more state values. Also Tang and McCabe assume that the state value of a parent node is either favorable or unfavorable. They do not account for more refined differences of the effect when a parent node can have one of more than two possible state values.

US patent application 2006020568 describes a software tool that provides the functionality to construct a BBN (i.e. to define nodes and their states and the dependencies between these nodes), to quantify the network (i.e. to input the necessary conditional probabilities), and to perform inference on the network. This tool only provides an input module for the conditional probabilities needed without giving guidance and support in how to gather these probabilities, especially in the case when the probabilities are obtained via expert judgement elicitation.

Other solutions have been proposed for relieving the elicitation task for discrete BBNs. One solution is to make it easier for the assessors to provide the probabilistic assessments required. Van der Gaag, Renooij, Witteman, Aleman and Taal (1999) aim to achieve this by transcribing the conditional probabilities and using a scale containing both numerical and verbal anchors. But the effort needed to assess a full CPT using this method, though reduced, is still exponential in the number of conditioning variables.

Another option for relieving the elicitation burden is to reduce the number of probabilistic assessments to be made. This can of course be achieved by reducing the number of conditions (parent nodes) or the number of states of the variables, but such reductions will often be undesirable (e.g. leading to loss of detail needed to inform a decision).

SUMMARY

Among others it is an object to provide for a method entering conditional probability data in a decision support apparatus that uses a Bayesian belief network, wherein the method allows more of the work involved in defining conditional probabilities to be moved from human experts to a computer without expert knowledge.

According to one aspect a computer implemented method is provided for providing in conditional probability data in a Bayesian Belief network based decision support apparatus, wherein the conditional probability data defines conditional probabilities of state values of a particular network node as a function of vectors of state values of a combination of parent nodes of the particular network node in the Bayesian Belief network, wherein at least one of the parent nodes has at least three possible state values, the computer implemented method comprising receiving elicited conditional probability data defining the conditional probabilities of the state value of the particular network node for a subset of all possible vectors of combinations of state values of the parent nodes;

interpolating conditional probability data defining the conditional probabilities of the state value of the particular network node for further possible vectors of state values of the parent nodes from the elicited conditional probability data, using an interpolation function that interpolates between the elicited conditional probability data as a function of influence factors assigned to the vectors;

receiving elicited data defining a ranking of state values of the at least one of the parent nodes, according to increasingly or decreasingly positive and/or negative influence of the state of the at least one of the parent nodes on the state of the particular node;

determining the influence factors for the possible vectors as a function of the ranking of the state values of the at least one of the parent nodes in the possible vectors.

By using interpolation on the basis of an elicited ranking of state values, the number of state vectors for which conditional probability data has to be entered by an expert can be minimized when the state values for a parent node can assume values from a range of more than two possible state values.

In an embodiment, the method comprises inputting, for each possible state value of the particular node, an elicited list of vectors of state values of the set of parent nodes that result in a highest conditional probability of that state value of the particular node;

inputting, for each of the vectors of state values of the set of parent nodes that result in a highest conditional probability, first elicited conditional probability data defining the conditional probability of the states of the particular node as a function of the state of the particular node, the method further comprising using the first elicited conditional probability data for said interpolation.

In this way the elicited list of vectors is used to guide the selection of state vectors that will be used for interpolation. Because the elicited vectors are selected by experts, it will be easier for the experts to give meaningful conditional probabilities for these selected vectors. By selecting the vectors for which particular node's state values have their maximum probability, the discriminatory power of the interpolation for the different states of the particular node is maximised, leading to the most accurate interpolation results.

In an embodiment the method comprises performing the interpolation separately for conditional probability data for each of a plurality of state values of the particular network node. Thus it is made possible to handle more than two possible state values for the particular node.

In an embodiment, the step of receiving comprises inputting elicited information, for extreme states of the particular node and each respective parent node, about second conditional probability data when in its least favourable state for a high probability for the highest ranking state of the particular node, and for the same parent node states when each time one parent is set to its most favourable state for a high probability for the highest ranking state of the particular node, defining the conditional probability of the extreme states when the respective parent node is in its most favorable and least favorable state for that extreme value respectively. For a parent node with its states ordered such that it has a positive influence, its lowest ranking state is its least favourable state for a high probability for the highest ranking state of the particular node. This information can be used to give different weights to different parent nodes.

Joint influence factors may be used for the interpolation, based for example on a sum of contributions dependent on the state value of respective parent nodes. This makes it possible to account for joint effects of different parent nodes. In another embodiment individual influence factors may be used, which depend on the vector of state values in the parent nodes only through the state value of one of the parent ones. This makes it possible to account for differences in importance of different parent nodes. Joint influence factors and individual influence factors may be used conjointly. This may be done for example by computing a range based average of interpolated conditional probabilities over a range of individual influence factor values, between a joint influence factor value for the vector of state values of the parent nodes and an individual influence for the state value of a respective one of the parent nodes.

BRIEF DESCRIPTION OF DRAWINGS

These and other objects and advantageous aspects of the invention will become apparent from a description of exemplary embodiments, using the following figures.

DETAILED DESCRIPTION OF EXEMPLARY EMBODIMENTS

In an embodiment an alternative input functionality for large CPTs in dedicated BBN software applications is provided. Rather than having to input all values for the CPTs one by one, this embodiment requires only a part of these large CPTs to be specified, thereby saving time and being less prone to input error.

In an embodiment an apparatus is provided that calculates all values of large CPTs based on a specification of only a part of this CPT. This apparatus makes it feasible to address the many occasions in which an expert has to assess the values of a large CPT one by one, previously considered infeasible due to the time needed for the specification and entry of all the probability values needed, the errors made inputting huge amounts of values, the discriminatory power required from the experts to tell apart the many (very) subtly different conditions and the requirements (mathematical) coherency puts on the conditional probabilities specified.

The apparatus also supports the process of eliciting the information needed from expert assessors to quantify a CPT, by providing the order in which the conditional probabilities should be assessed by the expert, in such a way as to minimize assessment bias due to the anchoring-and-adjustment heuristic.

Only part of the conditional probabilities needs to be inputted. In most applications this will mean the difference between the feasibility of inputting the CPT or not. Feasibility with respect to time needed to input the probabilities, the errors made by manually inputting the values, the time needed to elicit the probabilities from experts, the discriminatory power required from the experts to tell apart the many (very) subtly different conditions and with respect to the coherency of the conditional probabilities specified.

This document describes a methodology for deriving a node's CPT in the general case that the states of the node are ordered and the states of each of its parent nodes can be ordered with respect to the influence these parent nodes have on this node of interest. The method requires only a limited amount of probability assessments from experts to determine a node's full CPT; the number of probabilities to be assessed is linear in the number of parent nodes.

Implemented and incorporated in existing BBN software, this methodology provides the guidance and support needed to quantify BBNs with large conditional probability tables based on expert assessments.

Figure 1:
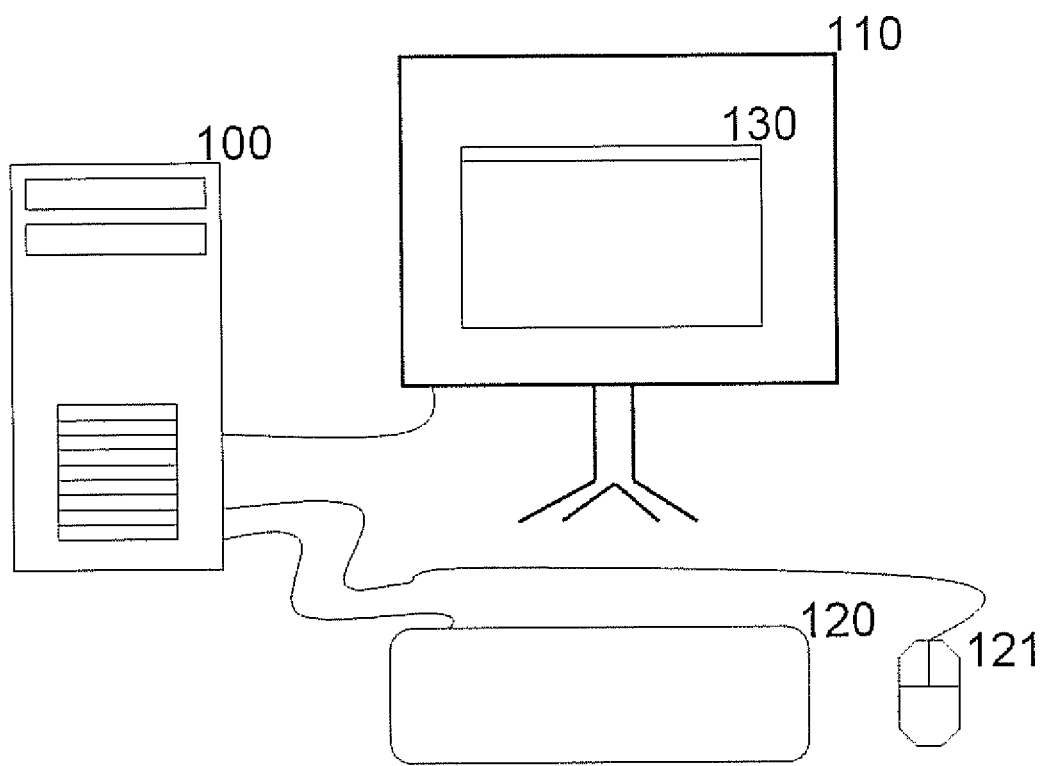
FIG. 1 shows a system for construction of a BBN

FIG. 1 depicts a system for the construction and analysis of BBNs. The system comprises a computer (100), coupled to a display device (110), and input devices keyboard (120) and pointing device (121). The computer may comprise with a mainboard, a CPU, harddrive and memory. A computer program for eliciting information to define a BBN is stored on the harddrive and executed by computer (100). This computer program will be termed BBN software application.

Figure 2:
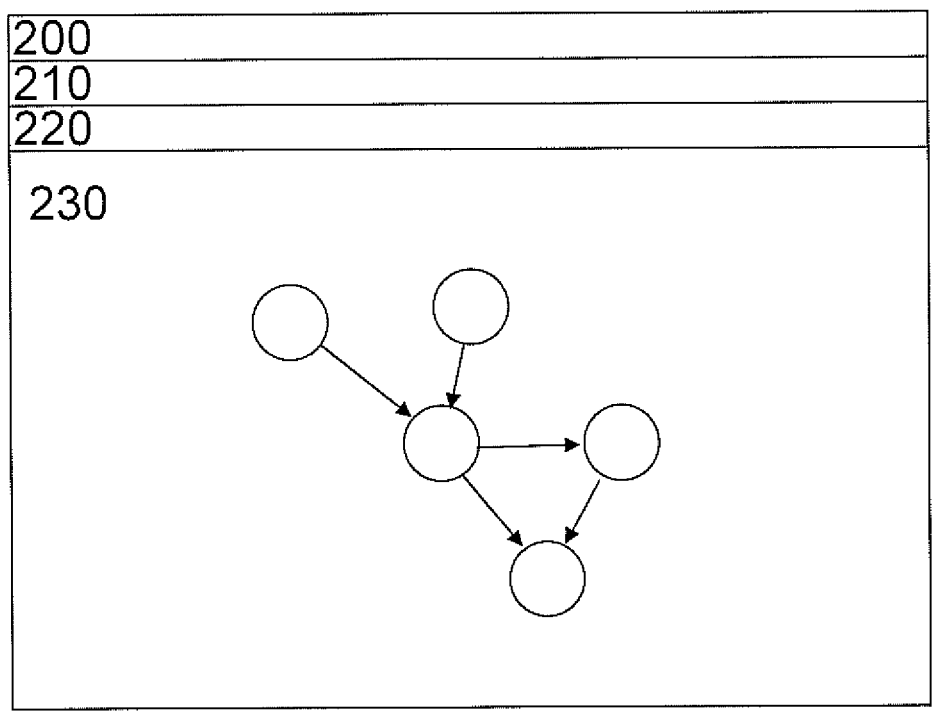
FIG. 2 shows a Graphical User Interface (GUI) of a BBN

FIG. 2 shows a schematic drawing of a typical Graphical User Interface (GUI) of a BBN software application. By way of example, the GUI contains a title bar (200), a menu bar (210) a tool bar (220) and a pane graphically displaying the BBN (230). For the qualitative phase of the construction of a BBN, BBN software applications typically support at least the functionalities:

Add node
Remove node
Rename node
Add state of a node
Remove state of a node
Rename state of a node
Change order of states of a node
Add arc
Remove arc The quantitative phase of the construction of a BBN is typically supported by the functionality:

Modify the CPT of a node.

Figure 3:
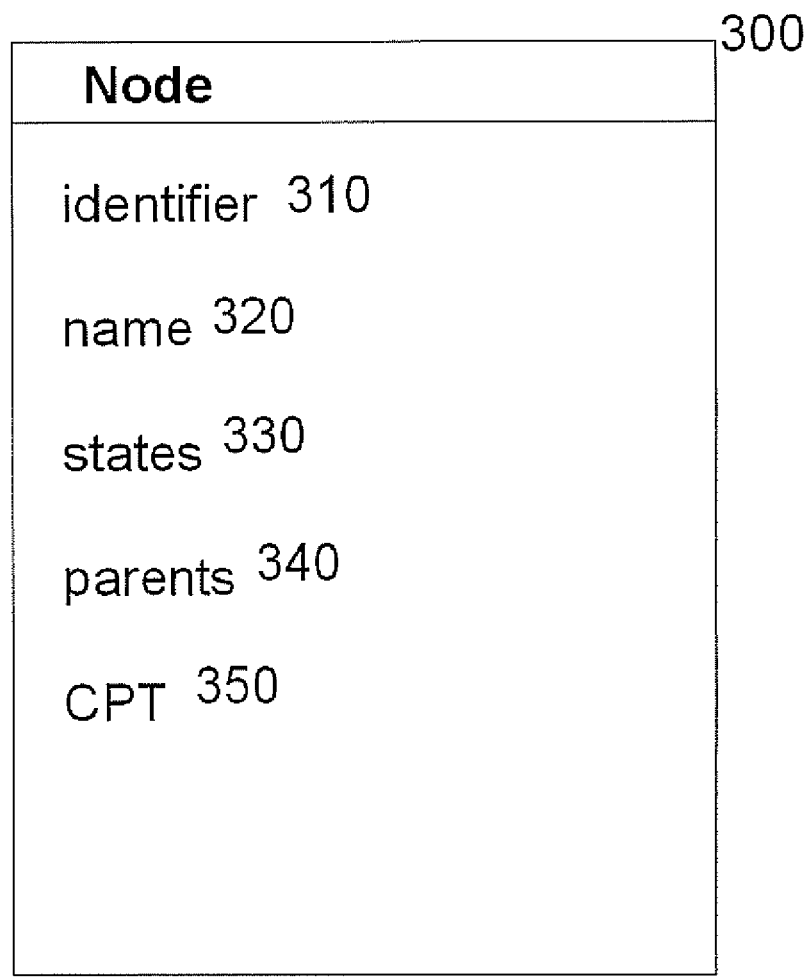
FIG. 3 shows information assumed available to and accessible by BBN software application.

FIG. 3 illustrates information about an instance of a BBN. In an embodiment we assume that the following information about an instance of a BBN in a particular BBN software application is available to and accessible by the application. The information comprises set of nodes (300) constituting the BBN, and for each node an information structure defining:

A unique identifier for the node (310)
A name of the node (320)
The states of the node, constituted by an ordered list of state names with the highest ranking state first (330)
The parents of the node, constituted by a list of node identifiers of the parent nodes (340)
The CPT of the node The CPT is a data structure describing the probabilities of the occurrence of the states of the node, conditional on the states of the parent nodes.

When the computer executing the BBN software application constructs a BBN, nodes are constructed by creating information structures. When the computer executing the BBN software application constructs a node, its CPT is initially filled with default values for the unconditional probabilities for the states of the node (for example 0 or the reciprocal of the number of states of the node). Adding a state for the node will commonly result in adding an entry for this new state to the CPT with probability 0. Adding a parent for the node will typically result in making the CPT conditional on the states of this parent, by default using the same probabilities (that were already present in the CPT) for each state of the parent. Adding a state to one of the parent nodes of a node will also lead to creating the appropriate entries in the CPT for this added condition.

So for each node that is in the set of nodes of a BBN instance a CPT structure with default probabilities is assumed to be available. The input functionality for the CPT of a node that dedicated BBN software applications provide is graphically depicted by FIG. 4.

When the computer executing the BBN software application receives a user input indicating that a user wishes to edit the CPT of a particular node (400), the computer first displays the CPT with its current (default) values (410), and create a of copy CPTc of the current CPT values. Then the computer executing the BBN software application waits for one of three types of user input:

1. Cancel: user input is received that the user wishes to cancel the editing of the CPT. The display of the CPT is closed (430), thereby discarding any changes.
2. The entry of a probability for a particular state s and a particular instance of parent node states s_p: the application will check whether the value received from the user input is a probability (440) (i.e. the input value is in the interval [0, 1]). If not, the application will display an error message and discard the input (441) and wait again for new user input (420). If the value entered is a probability, the application will check whether the sum of probabilities of the states of the node for the particular condition does not exceed unity (442). If the sum of probabilities exceeds 1, an error message is displayed and the entry is discarded (441), if not the probability for state s and instance of parent node states s_p in CPTc is overwritten by the new value (443) and the application will wait again for new user input (420).
3. OK: user input is received that the user wishes to finalise the editing of the CPT. The application first checks whether for all conditions (i.e. all instances of states of parent nodes) the probabilities of the states of the node sum to unity (450). If not, the application displays an error message describing a condition for which the probabilities do not sum to unity and advises the user to correct the probabilities (451) and waits again for user input (420). If so (the probabilities sum to unity for all conditions), the application overwrites the values of the CPT with the new values from CPTc and closed the display of the CPT (452).

Figure 4:
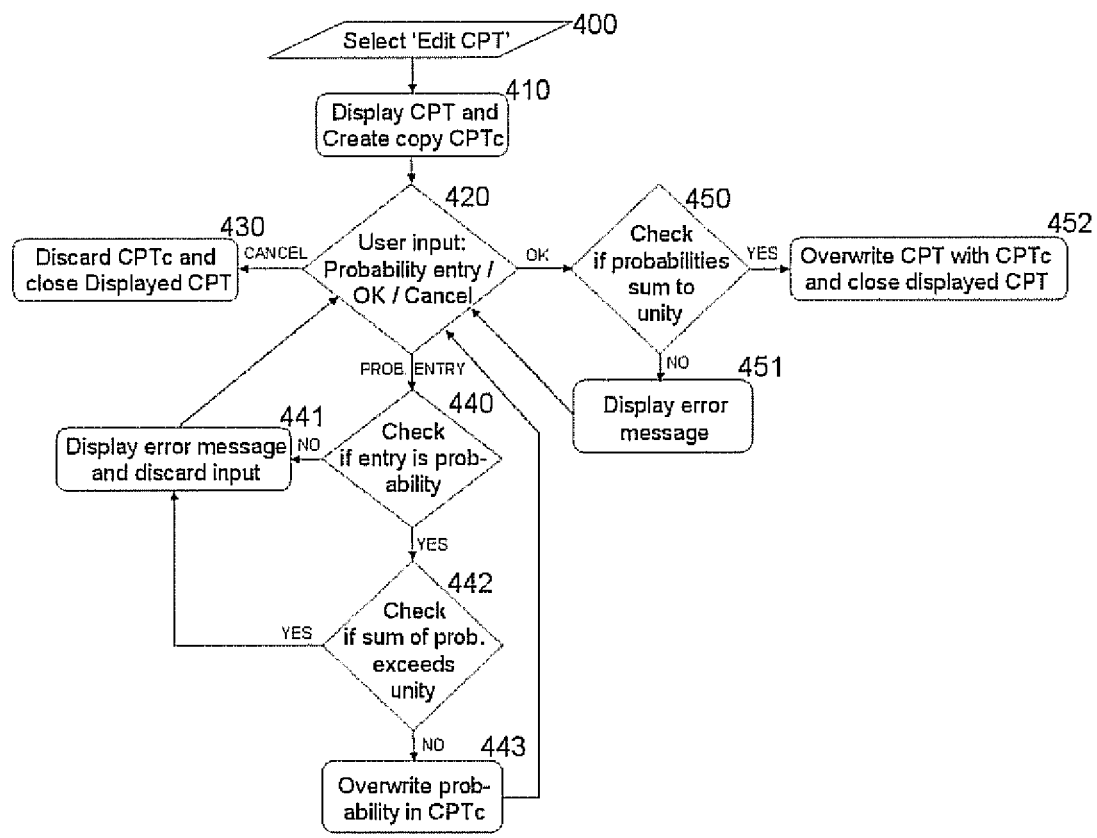
FIG. 4 shows a flowchart of prior art BBN software functionality to input a CPT.

Known BBN software applications available have CPT input functionality similar to the one described in FIG. 4. For known BBN software applications the probabilities that constitute a node's CPT will have to be entered one by one by the user. Alternatively most dedicated BBN software applications support importing CPT probabilities from other software like MS Excel. When the probabilities of a CPT are elicited from experts, these probabilities will have to be entered one by one in one software application or another.

In principle, the conditional probability of each state S of a node is conditional on a vector of states of the parent nodes of that node. The total number of possible vector values, that is, the number of possible combinations of states of the parent nodes equals the product of the counts of states of the respective parent nodes. If these counts would all be equal, the total number of possible vector values would depend exponentially on the number of parent nodes. As a result, the number of probabilities that would have to be entered can grow large very easily when the number of parents of a node increases, when the prior art input scheme for entering all probabilities is used as described above for FIG. 4.

To overcome this problem interpolation is used to determine conditional probabilities for nodes. Any one of a number of interpolation techniques may be used, which allow for any number of possible state values. Different numbers of possible state values may be used for different nodes. Thus, for example, a state value of one node range over three possible values {low, medium and high} and a state value another node may range over eleven possible values {0.0, 0.1, . . . 1.0}. Conditional probabilities for each of a plurality of state values of a current node are determined by the computer.

According to a first technique, the conditional probabilities for each of a plurality of state values of a current node are determined by interpolation. The conditional probability for each state value x of the current node is treated as a function that is an interpolation between conditional probabilities that have been provided by experts for specific combinations of state values of the parent nodes.

In the first technique, the interpolated function depends on what will be called an influence factor, which is determined from the components of the vector of state values of the parent nodes of the current node. The conditional probability for a state value x of the variable of a current node may now be determined by (1) computing all influence factors for vectors of state values of the parent nodes for which an expert has defined conditional probabilities of the state value x for the current node, (2) computing the influence factor of the vector for which the conditional probability must be computed (3) selecting the vectors with the closest influence factor values above and below this influence factor for which the expert has defined conditional probabilities of the state value X for the current node and (4) interpolating between the defined conditional probabilities for these vectors, as a function of the influence factor.

The influence factor is determined from the components of the vector of state values of the parent nodes of the current node. The influence factor may be determined using rankings Rank($x_k$) of state values "$x_k$" that have been provided by an expert, each ranking sorting the possible state values "$x_k$" of a respective one of parent nodes "k" according to their influence on the state value of the current node (in terms of making higher state values in a sequence of the state values of the current node more likely).

An expression for the influence factor in terms of the state values of the parent nodes may be used that is a sum of contributions from the individual parent nodes. The contribution for a parent node is computed from the ranking of the state value of the parent node, with increasing contribution values for ranks that are closer to the highest rank in case of a positive influence. The following expression may be used for the influence factor INF when the influence of all parent nodes is positive $$INF = norm^{-1} * sum_k Rank(x_k)$$

Herein the sum is taken over all parent nodes "k", "$x_k$" is the state value of the parent node k, Rank($x_k$) is the rank of that state value (the lowest rank being zero) and "norm" is a sum of the ranks for the highest possible state values for the different parent nodes. It should be emphasized that the expression is an example: other expressions with similar effects may be used. The exact expression is not critical. For parent nodes that have a negative influence, a different contribution in the sum may be used, according to $$\max Rank(X_k) - Rank(x_k)$$

Herein maxRank($X_k$) is the highest rank assigned to any one of the state values of parent node k. It should be emphasized that the expression is an example: other expressions with similar effects may be used. The exact expression is not critical.

In principle, conditional probabilities defined for any set of vectors of state values of the parent nodes may be used in this interpolation. In a further embodiment, the vectors of variables that are used in the interpolation are selected by asking the expert to indicate for each possible state value x of the current node which vector of state values of the parent nodes will lead to the highest possible probability of that state value x and the expert is asked to define the probabilities for all possible state values x of the current node for that vector. In this embodiment these probabilities are used for interpolation. This has the advantage that the interpolation can handle peaks in the probability as a function of influence factor and that the expert is enabled to supply mutually consistent probabilities as a function of the state value x of the current node for the same vectors of parent node state values.

In this way the computer is able to determine conditional probabilities for the variable of a current node based on a limited amount of outside input. This input includes an input of rankings of the possible state values of the parent nodes of the current nodes. Furthermore the input includes the input of conditional probabilities of different state values x of the current node for a set of vectors of state values of the parent nodes at which maximum probabilities are achieved for respective possible state values of the variable X, the current node.

In an embodiment, the conditional probabilities may be refined to distinguish different influences from different parent nodes. The type of interpolation that was described in the preceding interpolates on the basis of a common influence factor that represents the joint effects of all parent nodes by one number. This hides differences between different parent nodes. For example, if a first parent node has a high ranking state value and a second parent node has a low ranking state value, the common influence corresponds to an average of the ranking values. If the strength of the influence of both parent nodes is the same, this may be a good approximation, but if variation of the ranking of the first parent node have more influence than variation of the ranking of the second parent node an error may result.

In an embodiment, the computer accounts for the difference between influences from different parent nodes by computing the conditional probabilities from an average of alternative conditional probabilities $P_k(X)$ that each account for the individual influence of a respective one of the parent nodes. A weighted average may be used:

$$\text{Sum } w_k * P_k(X)$$

Herein the $w_k$ are weights assigned to different parent nodes, which sum to one and $P_k$ are the alternative conditional probabilities for a state value X of the current node.

In a further embodiment, the computer computes each alternative conditional probability $P_k$ by determining an individual influence factor INF(k) for its respective one "k" of the parent nodes and averaging interpolations of the conditional probability for influence factors over a range of influence factors between the common influence factor INF and this individual influence factor INF(k).

The weights $w_k$ in the weighted average of alternative conditional probabilities may be selected in proportion to the effect of individual parent nodes on the probability when all other parent nodes have state values that work in the same direction on the conditional probability. Thus more weight may be given to parent nodes that have a stronger effect. In an embodiment, the computer determines the weights according to $$w_k = 0.5*(P'_{max}(k) - P_{max})/\text{norm1} + 0.5*(P_{min} - P'_{min}(k))/\text{norm2}$$

Herein $P_{max}$ is the probability of the highest ranking state value $x_{max}$ of the current node, when the state values of all parent nodes are in their most favorable state for a high probability of the lowest ranking state value of variable (node) X. $P'_{max}(k)$ is the probability of the highest ranking state value of the variable X for the same parent node state values, except that the state value for parent node "k" is most favorable for a high probability of the highest ranking state value of the variable X. norm1 is the sum of $(P'_{max}(k) - P_{max})$ over different parent nodes.

Similarly $P_{min}$ is the probability of the lowest ranking state value of the current node, when the state values of all parent nodes are in their most favorable state for the lowest ranking state value of the variable X. $P'_{min}(k)$ is the probability of the lowest ranking state value of the variable X for the same parent node state values, except that the state value for parent node "k" is most favorable for a high probability of the highest ranking state value of the variable X. norm2 is the sum of $(P_{min} - P'_{min}(k))$ over different parent nodes.

In this way the computer is able to refine conditional probabilities for the variable X of a current node based on a limited amount of further outside input. This further input includes an input of conditional probabilities when the state values of all parent nodes have their most favorable value for the lowest ranking state value of the variable X, except that for the state value of one parent node at a time.

In an embodiment the determination of the conditional probabilities takes place as follows. It is assumed that the assessor (a human information provider) has confirmed that the state values $x_c$ of a current node are ordered and that the assessor can order the state values $x_k$ of each of the parent nodes from the set $pa(X_c)$ of parent nodes of the current node such that (s)he judges either $S^+(X_k, X_c)$ or $S^-(X_k, X_c)$ to hold. $S^+(X_k, X_c)$ is said to hold if $X_k$ from $pa(X_c)$ has a positive influence on $X_c$, meaning that observing a higher ranking state value $x_k$ for $X_k$ does not decrease the likelihood of higher ranking values $x_c$ of $X_c$, regardless of the values of the other variables $pa(X_c)$ except $X_k$. In other words, for all values $x_c$ of $X_c$, for all pairs of distinct values with $\text{Rank}(x_{k,n}) > \text{Rank}(x_{k,o})$ of $X_k$, and for all possible assignments $a_{-k}$ for the set of $pa(X_c)$ except for $X_k$, $P(\text{Rank}(X_c) > \text{Rank}(x_c) | x_{k,n}, a_{-k}) >= P(\text{Rank}(X_c) > \text{Rank}(x_c) | x_{k,o}, a_{-k})$.

The definition of a negative influence, $S^-(X_k, X_c)$, is completely analogous and would involve only reversing the above inequality.

With this assumption the following input assessments are used to determine the CPT for variable $X_c$ with conditioning variables $pa(X_c)$:

1. (ordering). For each of the conditioning variables $X_k$ from $pa(X_c)$: order the values of $X_k$ such that $X_k$ has either a positive or a negative influence on $X_c$. Fix and record this ordering of the values and the nature of the influence.
2. (typical probabilities). For each of the values $x_c$ of $X_c$:
   (a) determine the assignment $pa(X_c) = a_{xc}$ such that the probability $P(X_c = x_c | a_{xc})$ is as large as possible.
   (b) assess the probabilities $P(X_c | a_{xc})$.
   Due to dominance of one of the conditioning variables $a_{xc,min}$ ($a_{xc,max}$) need not be unique, where $x_{c,min}$ ($x_{c,max}$) is the lowest (highest) ranking value of $X_c$. Therefore $a_{xc,min}$ ($a_{xc,max}$) is by default set to be the assignment in which all the conditioning variables are in their most favourable state for low (high) ranking values of $X_c$, referred to as $a_{neg}$ ($a_{pos}$).
3. (weights). For each of the conditioning variables $X_k$ from $pa(X_c)$, assess $P(X_c = x_{c,max} | a_{neg,k+})$ and $P(X_c = x_{c,min} | a_{neg,k+})$, where $x_{c,max}$ and $x_{c,min}$ are resp. the highest and lowest ranking value of $X_c$, and $a_{neg,k+}$ is the assignment of $pa(X_c)$ in which $X_k$ is in its most favourable state for high ranking values of $X_c$, and all $X_j$ from $pa(X_c)$ except $X_k$ are in their least favourable state for higher ranking values of $X_c$.
4. (dominance). For each of the conditioning variables $X_k$ from $pa(X_c)$, determine whether $X_k$ has either no, a positive or a negative dominance over $X_c$.

The derivation of the CPT of $X_c$ is done in a two-step procedure, using the previous assessments. In the first step the probabilities $P(X_c)$ are expressed as a function of an influence factor i. In the second step individual and joint influence factors are determined for all assignments of pa($X_c$), which are then used to derive the probabilities P($X_c$) from the functions of step 1.

The influence factor i is an expression of the positiveness (or negativeness) of the joint influence of the parent variables pa($X_c$) on $X_c$. It is a function of the state values of the parent variables, with i(a) between zero and one. i($a_{neg}$) is set to 0, where pa($X_c$)=$a_{neg}$ is the assignment in which all the conditioning variables are in their most favourable state for low ranking values of $X_c$. And, at the other extreme, i($a_{pos}$) is set to 1. For all other assignments i is in the interval (0, 1). If assignment $a_2$ has a strictly more positive influence on $X_c$ than $a_1$—i.e. if P(Rank($X_c$)>Rank($x_c$)|$a_2$)>P(Rank($X_c$)>Rank($x_c$)|$a_1$) for all $x_c$—then the influence factor corresponding to $a_2$ should be bigger than the influence factor corresponding to $a_1$.

Use is made of two separate influence factors: the individual influence factor $i_k$ for each conditioning variable $X_k$ from pa($X_c$) and the joint influence factor $i_{joint}$. As will become more clear later on, $i_k$ will contain information about the influences exercised by each of the parent variables individually, $i_{joint}$ about the 'general tendency' of all of the parent influences together. The individual influence factor $i_k$ for $X_k$ from pa($X_c$) is determined as follows:

$$i_k(x_k) := \begin{cases} \dfrac{\text{rank}(x_k)}{\text{rank}(x_{k,max})} & \text{if } S^+(X_k, X_c) \\ \dfrac{\text{rank}(x_{k,max}) - \text{rank}(x_k)}{\text{rank}(x_{k,max})} & \text{if } S^-(X_k, X_c) \end{cases} \quad (1)$$

where the rank of the smallest value is set to be 0 and $x_{k,max}$ is the highest ranking value of $X_k$. So if $X_k$ from {low, medium, high} has a positive influence on $X_c$, we find that $i_k$(low)=0, $i_k$(medium)=0.5 and $i_k$(high)=1. The joint influence factor $i_{joint}$ for assignment pa($X_c$)=a is derived as:

$$i_{joint}(a) := \frac{\sum_{\{k: X_k \in pa(X_c)\}} i_k(x_k) \cdot \text{rank}(x_{k,max})}{\sum_{\{k: X_k \in pa(X_c)\}} \text{rank}(x_{k,max})} \quad (2)$$

Verify that indeed $i_{joint}(a_{neg})$=0 and $i_{joint}(a_{pos})$=1. Also note that the individual influence factor of $X_k$, $i_k$, is equal to the joint influence factor $i_{joint}$ if pa($X_c$)={$X_k$}, i.e. if the set of parents of $X_c$ merely consists of $X_k$.

Step 1. Estimating P($X_c$) as a Function of Joint Influence Factor $i_{joint}$

Figure 9:
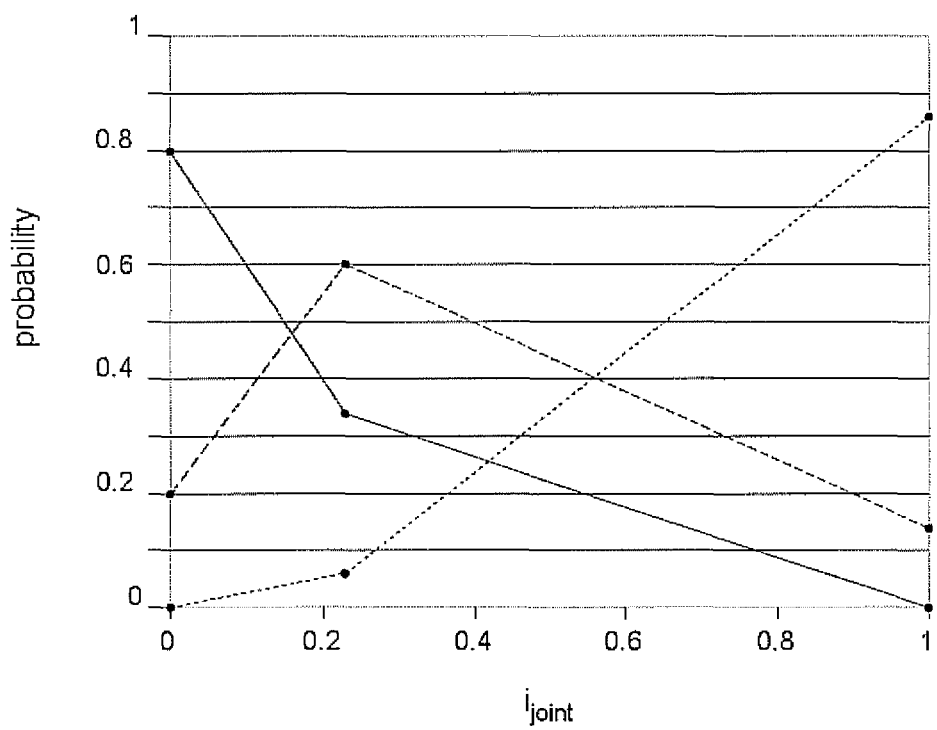
FIG. 9 shows piecewise linear functions through points from Table 1

In this step P($X_c$=$x_c$) is estimated as a function of joint influence factor $i_{joint}$, for each value $x_c$ of $X_c$. For this we use the orderings and the assignments $a_{xc}$ and probabilities P($X_c$=$x_c$|$a_{xc}$) assessed at 2. We construct the piecewise linear functions $f_{xc}$:[0, 1] mapped to [0, 1] through the points ($i_{joint}$($a_{xc}$), P($X_c$=$x_c$|$a_{xc}$)). It can be easily verified that using these linear interpolations ensures that the sum $f_{xc}$(i)=1, i.e. the sum of the probabilities of occurrence of the different values of $X_c$ equals unity for all i from [0, 1]. Coherency requires that if Rank($x_{c,n}$)>Rank($x_{c,m}$), also $i_{joint}$($a_{xc,n}$)>$i_{joint}$($a_{xc,m}$). In FIG. 9 an example is given for how this estimation of P($X_c$) as a function of $i_{joint}$ might look like. In this example $X_c$ belongs to {low, medium, high}, and the points ($i_{joint}$($a_{xc}$), P($X_c$=$x_c$|$a_{xc}$)) are assessed as in Table 1.

TABLE 1

Example assessments of ($i_{joint}(a_{x_c})$, P($X_c$ | $a_{x_c}$)) for $X_c \in$ {low, medium, high}

| $x_c$ | ($i_{joint}(a_{x_c})$) | P($X_c$ | $a_{x_c}$) |
|---|---|---|
| low | 0 | P($X_c$ = low \| $a_{low}$) = 0.79 |
|  |  | P($X_c$ = medium \| $a_{low}$) = 0.20 |
|  |  | P($X_c$ = high \| $a_{low}$) = 0.01 |
| medium | 0.22 | P($X_c$ = low \| $a_{medium}$) = 0.35 |
|  |  | P($X_c$ = medium \| $a_{medium}$) = 0.60 |
|  |  | P($X_c$ = high \| $a_{medium}$) = 0.05 |
| high | 1 | P($X_c$ = low \| $a_{high}$) = 0.01 |
|  |  | P($X_c$ = medium \| $a_{high}$) = 0.14 |
|  |  | P($X_c$ = high \| $a_{high}$) = 0.85 |

Step 2. Deriving the Conditional Probabilities

In Step 1 we obtained P($X_c$) for all possible values of $i_{joint}$ via linear interpolation, and equation (2) provides us with an expression for $i_{joint}$ for all assignments pa($X_c$)=a. P($X_c$|a) can now be determined via P($X_c$|$i_{joint}$(a)) from the functions $f_{xc}$ of Step 1. Yet this mapping from assignments a for the conditioning variables pa($X_c$) to an expression $i_{joint}$ is not unique. Suppose pa($X_c$)={$X_j$, $X_k$, $X_l$}, $X_j$ and $X_l$ both exercise the same type of influence (positive or negative), and $X_j$, $X_k$, $X_l$ from {low, medium, high}, then $i_{joint}$({medium,medium,medium})=$i_{joint}$({low,medium,high})=0.5.

Figure 10:
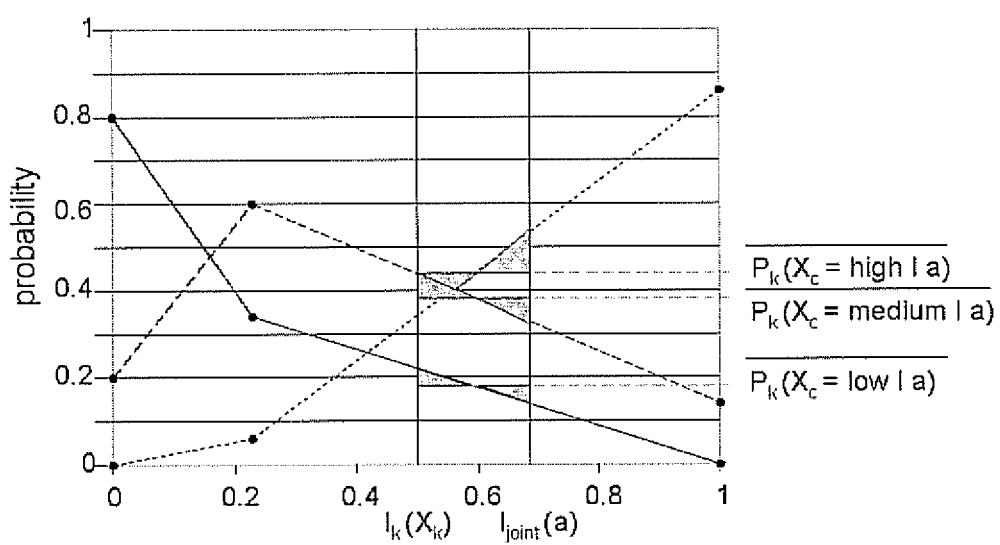
FIG. 10 shows an example of average probabilities

As pointed out earlier, $i_{joint}$ is an expression for the 'general tendency' of the influence of the conditioning variables. It does not take into account the (dis)agreement of the influences of each of the conditioning variables individually. To account for both the 'general tendency' and the individual influences of the conditioning variables, we calculate for each conditioning variable $X_k$ from pa($X_c$) the average of the probabilities $P_k$($X_c$|a) over the interval (min($i_k$($x_k$), $i_{joint}$(a)), max ($i_k$($x_k$), $i_{joint}$(a))). An example of this average, denoted with $\overline{P_k(X_c|a)}$, is illustrated in FIG. 10. We derive the desired probabilities P($X_c$|a) as the average over the distributions $\overline{P_k(X_c|a)}$. Or actually the weighted average $$P(X_c | a) = \sum_{k: X_k | pa(X_c)} w_k \cdot \overline{P_k(X_c | a)}, \quad (3)$$

since one parent could have a stronger influence on $X_c$ than another. For the same relative change in states, i.e. changes in states resulting in the same absolute change in each of the individual influence factors, the probabilities for $X_c$ might change more for one parent variable than for another. Therefore we calculate the weight $w_k$ for each parent $X_k \in$ pa($X_c$), in the following way:

$$w_k = \frac{1}{2} \frac{\delta_k^+}{\sum_{l_1 X_l \in pa(X_c)} \delta_l^+} + \frac{1}{2} \frac{\delta_k^-}{\sum_{l_1 X_l \in pa(X_c)} \delta_l^-} \quad (4)$$

with, $\delta_k^+ = P(X_c = x_{c,max} | a_{neg,k+}) - P(X_c = x_{c,max} | a_{neg})$ $\delta_k^- = P(X_c = x_{c,min} | a_{neg}) - P(X_c = x_{c,min} | a_{neg,k+})$.

For the derivation of the weights we have taken the situation in which each parent is in its least favourable state for high ranking values of $X_c$, $a_{neg}$, as the base. We use the probabilities P($X_c$=$x_{c,max}$|$a_{neg,k+}$) and P($X_c$=$x_{c,min}$|$a_{neg,k+}$).

Each $\delta_k^+$ and $\delta_k^-$ now expresses the changes in the probabilities of resp. the highest and lowest state of $X_c$, if the one parent $X_k$ is set to its most favourable state for high values of $X_c$ whilst leaving the other parents in their least favourable states ($a_{neg,k+}$). We obtain the weights from these $\delta$'s via the normalisations (4).

To a large extent the choice of the base assignment $a_{neg}$ and the probabilities $P(X_c = x_{c,max} | a_{neg,k+})$ and $P(X_c = x_{c,min} | a_{neg,k+})$ to derive the weights is arbitrary. Even though, we feel the choice for these assignments is one of the most natural choices that can be made. And, more importantly, we feel these assignments are relatively easy for assessors to consider and assess. It is of course possible to use more assessments to determine the weights more accurately. However, we feel that the possible added value does not weigh against the burden of the extra elicitation effort needed.

The desired probabilities $P(X_c | pa(X_c) = a)$ are derived by rewriting (3) using (1), (2) and (4), as $$P(X_c \mid pa(X_c) = a) = \sum_{k: X_k \mid pa(X_c)} w_k \cdot \frac{\int_{i_{min,k}}^{i_{max,k}} f(i) \cdot di}{i_{max,k} - i_{min,k}} \quad (5)$$

where $i_{min,k} = \min(i_k(x_k), i_{joint}(a))$, $i_{max,k} = \max(i_k(x_k), i_{joint}(a))$ and $f(i) = (f_{x_{c,min}}(i), \ldots, f_{x_{c,max}}(i))$.

Finally, we deal with negative and positive dominance of one of the parent variables in the following straightforward way: for all the assignments $a_d$ in which a negative (positive) dominant parent is in its least (most) favourable state for high ranking values of $X_c$, we set $P(X_c | a_d)$ to be equal to $P(X_c | a_{neg})$ ($P(X_c | a_{pos})$), and we ignore the dominant state value of the dominant parent in the interpolation process.

Figure 5:
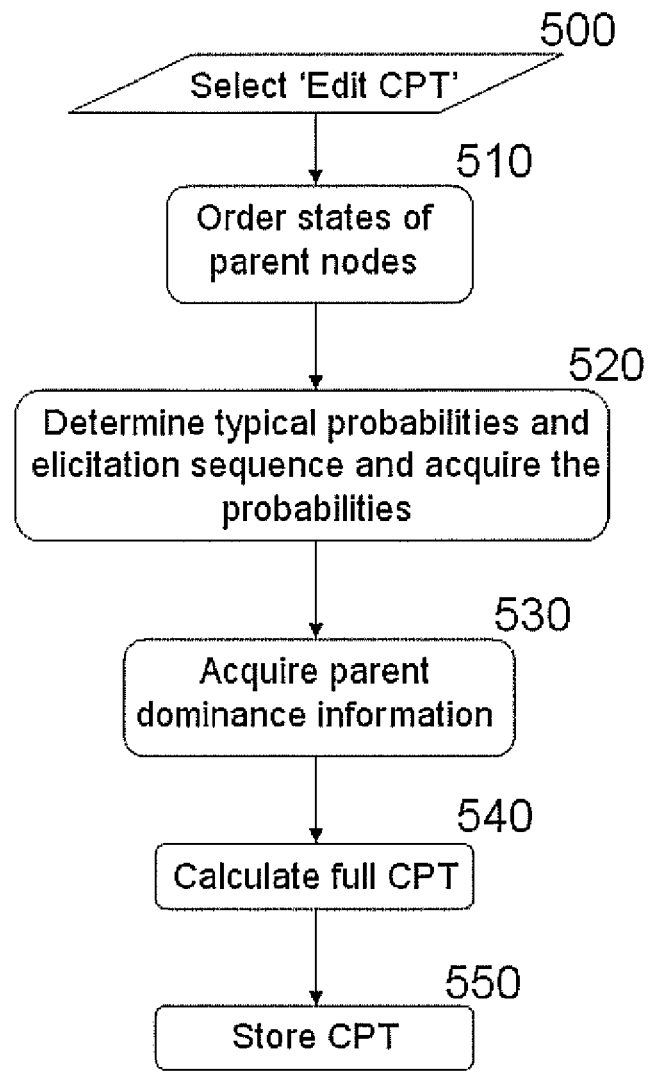
FIG. 5 shows a flowchart of machine aided CPT input functionality.

FIG. 5 illustrates an embodiment of an interpolation method to generate values for the CPT of a node. When the user wishes to edit the CPT of a particular node the computer executing the BBN software application first re-orders the states of the parent nodes such that the influence of the parent node on the particular node under consideration (510) is monotonically non-decreasing or non-increasing in the list.

Figure 6:
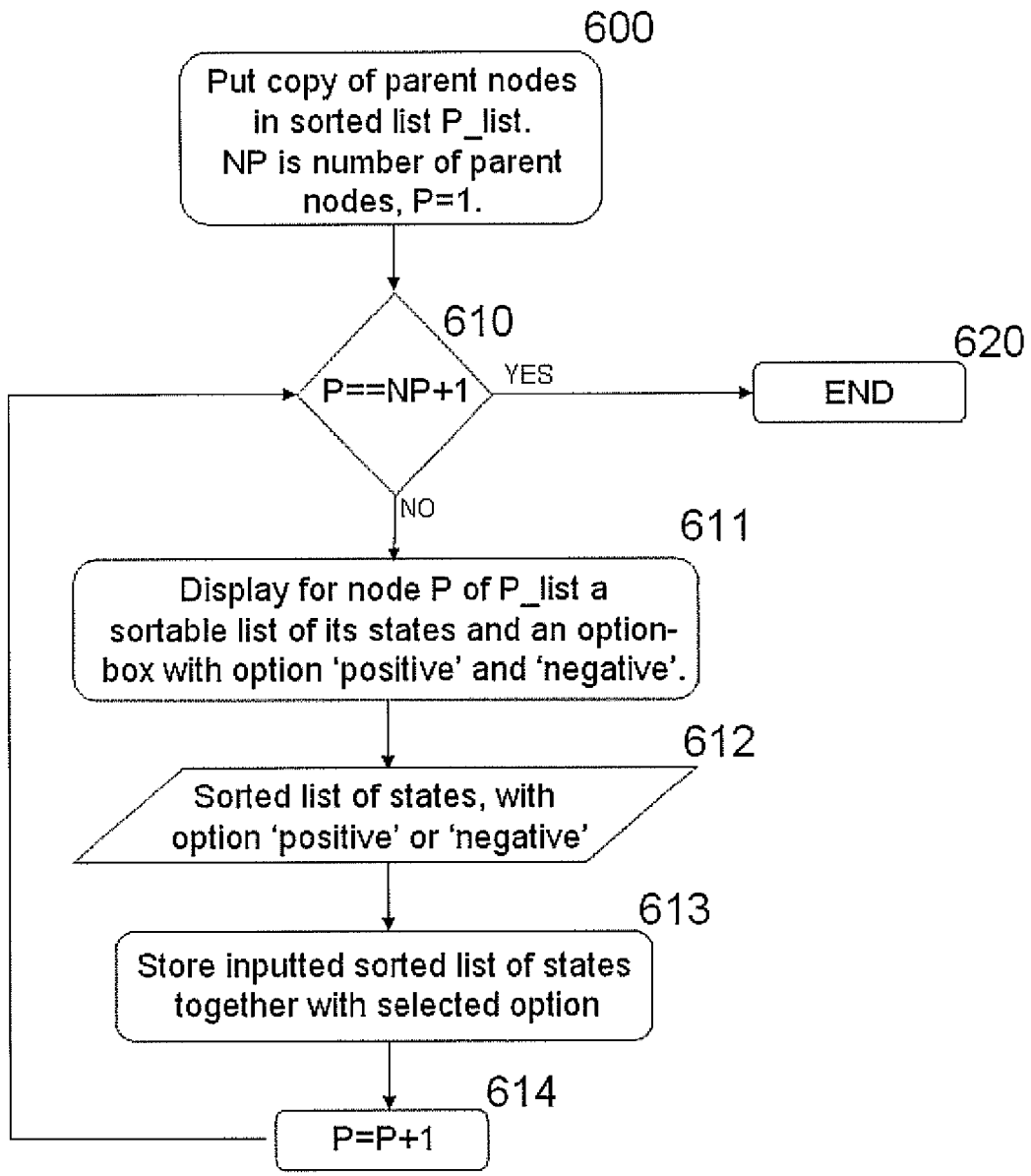
FIG. 6 shows flowchart of the ordering of the parent node states with respect to the influence the practice on the node of interest.

FIG. 6 shows a flow chart of this task in more detail. First the computer executing the BBN software application makes a copy of all the parent nodes of the particular node and puts these in a sorted list (600). Then, for one parent node at a time (610, 614), the computer executing the BBN software application asks the user (611) to sort the states of the parent node (612). If the option 'positive' is selected by the user, then the parent's states will be inputted by the user in an order such that the probability of higher ranking states of the node conditional on the current parent state Sp will not decrease if the state of the parent, Sp, is increased (i.e. a state with a higher rank is taken for the parent). The parent state with the highest probability for the highest ranking state of the particular node is referred to as the highest (ranking) parent state. If the option 'negative' is selected by the user, the inputted order of parent states will be such that the probability of higher ranking states of the particular node conditional on the current parent state Sp will not increase if the state of the parent, Sp, is increased (i.e. a state with a higher rank is taken for the parent). In this case the parent state with the lowest probability for the highest ranking state of the particular node is referred to as the highest (ranking) parent state. The computer executing the BBN software application stores the inputted type of influence ('positive' or 'negative') and the inputted order of parent node states in a list with the highest ranking state first in memory (613).

Then the computer executing the BBN software application determines a subset of conditional probabilities of the CPT that need to be inputted, the sequence in which they should be elicited from an expert, and finally acquires these probabilities (520).

Figure 7:
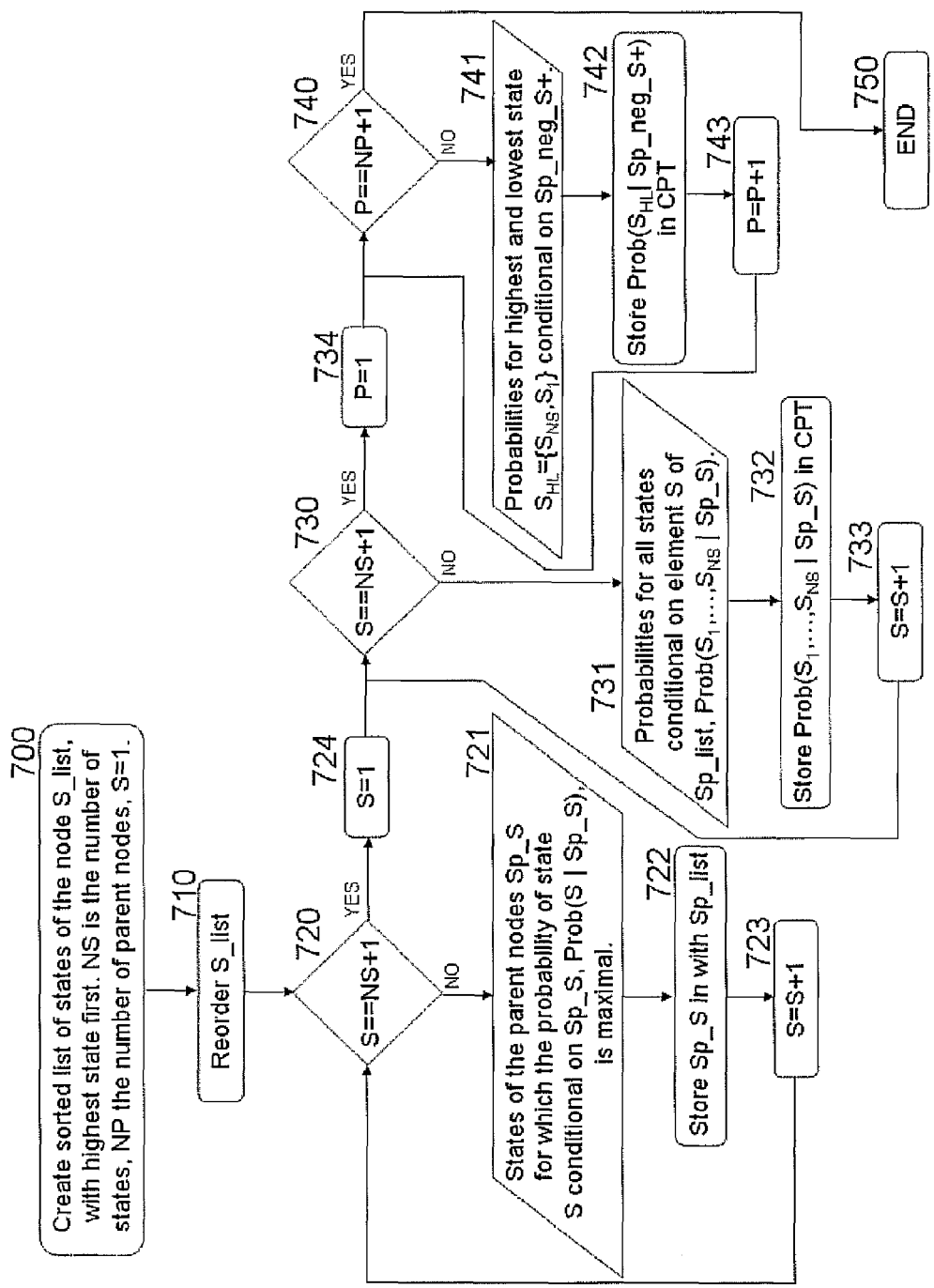
FIG. 7 shows a flowchart of the determination of the probabilities of the CPT, the elicitation sequence of these and the actual acquisition of these probabilities.

FIG. 7 shows a flowchart of this task. First the computer executing the BBN software application creates a sorted list of the states of the particular node (700). If the states indicate values, or ranges of values, of a variable, the states may be ordered according to this value. Then an order of queries is optionally determined from this list (710) to minimize the risk of bias, introduced by (un)intentional use of the anchoring-and-adjustment heuristic by the expert, when the expert enters probabilities. For example, if the rank of the highest state is N, and of the lowest state 1, an order that minimizes bias is: N, 1, N−1, 2, N−3, 3, . . . until all the states are in the re-ordered list. Next the application 'walks' through this list from first to last element two times:

1. The first time for each state S of the particular node the expert is asked to indicate a combination of states Sp_S of the parent nodes that results in the highest conditional probability of the state S, among all possible combinations of states of the patent nodes (721) and the result is stored (722). Herein Sp_S are the states of the parent nodes that influence the node.
2. The second time the probabilities for all states of the particular node conditional on the combinations of parent states Sp_S specified in the previous loop, Prob $(S_1, \ldots, S_{NS} | Sp\_S)$, are queried from the user (731) and stored in the CPT (732).

In loop (740, 743) evaluating one by one each parent node P, the computer executing the BBN software application queries the user (741) for the probability of the highest and lowest state value of the particular node, $S_H$ and $S_L$, conditional on the following states for the parent nodes: the condition wherein the parent node P is in its "most favourable state" and wherein all other parent nodes are in their "least favourable" state. The "most favourable" and "least favourable state" of a parent is determined as follows: if a parent node is determined to have a positive influence (in 612), its most favourable state is its highest ranking state (the first state in the list of states for the parent in memory (613)) and its least favourable is its lowest ranking state (the last state in the list). If a parent node is determined to have a negative influence (in 612), its most favourable state is its lowest ranking state (the last state in the list of this parent's states) and its least favourable is its highest ranking state (the last state in the list). The computer executing the BBN software application stores the probabilities of 741 in the node's CPT (742).

After acquiring these specific probabilities, the computer executing the BBN software application will ask the user to input for each parent node whether the parent node (530) is negative dominant (value −1) is positive dominant (value 1) or is not dominant (value 0). Herein a parent node of the particular node is said to be a positive dominant parent node if the conditional probabilities for states of the particular node do not depend on the state of its other parent nodes when the positive dominant parent node is in its most favourable state. Similarly, a parent node of the particular node is said to be a negative dominant parent node when the conditional probabilities for states of the particular node do not depend on the state of its other parent nodes when the positive dominant parent node is in its least favourable state.

It should be carefully noted that the amount input data in all these input steps grows at least proportionally to the number of parent nodes. This should be contrasted with the prior art input of conditional probabilities that grows exponentially with the number of parent nodes.

In step 540 the computer executing the BBN software application uses the information gathered at 510, 520 and 530 to calculate all the conditional probabilities of the CPT. The function 'calculate_CPT' may use the following six auxiliary functions (the CPT is assumed accessible by all functions):

Function i_i(S): calculates and returns the individual influence factor of the parent for state S. The rank of the lowest state is set to be 1, the rank of the highest state is then equal to the number of states of the parent, NS.

```
i__i=(rank(S)−1)/(NS−1)
IF the user has indicated that the parent has negative
effect on the node (see step 612, 613)
     i__i=1 − i__i
ENDIF
Return: i__i
```

Function i_j(Sp): calculates and returns the joint influence factor for the vector Sp of parent state values.

```
i__j__d=0
i__j__n=0
FOR each parent
    NS = the number of states of this parent
    S = the state of this parent in Sp
    i__j__n= i__j__n+i__i(S)*(NS−1)
    i__j__d= i__j__d+(NS−1)
ENDFOR
i__j= i__j__n/ i__j__d
Return: i__j
```

Function i_j_list(Sp_list): calculates and returns a list of influence factors for the elements of Sp_list, which are vectors of parent states.

```
FOR each element Sp of Sp__list
    i__j=i__j(SP)
    add i__j to i__j__list
ENDFOR
Return: i__j__list
```

Function prob_i(x, i_j_list): calculates and returns probabilities for the state values of the node for influence factor x, computed using a list of elements with influence factors for corresponding to elements of the Sp_List of vector of parent states. x must be in the interval [0,1].

```
low=0
high=1
FOR each element i__j of i__j__list
    IF i__j.influence__factor > low AND
        i__j.influence__factor <= x
        low=i__j
    ENDIF
    IF i__j.influence__factor <high AND
        i__j.influence__factor >= x
        high=i__j
ENDIF
prob__low=vector of probabilities for the parent
    states Sp for which the joint influence factor
    is equal to the value 'low'. These
    probabilities can be retrieved from the CPT.
prob__high= vector of probabilities for the parent
    states Sp for which the joint influence factor
    is equal to the value 'high'. These
    probabilities can be retrieved from the CPT.
IF high = = low
    prob__i=prob__low
ELSE
    prob__i=((x−low)*prob__low+(high−x)* prob__high)
           /(high−low)
ENDIF
Return: prob__i
```

Function prob_i_av(x, y, i_j_list): calculates and returns the average probabilities for the state values of the node on the influence factor interval [min(x,y), max(x,y)]

```
i__min=−99
i__max=−99
prob__i__x=prob__i(x, i__j__list)
prob__i__y=prob__i(y, i__j__list)
IF x < y
    i__min=x
    i__max=y
ELSE
    i__min=y
    i__max=x
ENDIF
i__int = list of influence factors consisting of the
element x and y
FOR each element i__j of i__j__list
    IF: i__j > i__min AND i__j < i__max
        add i__j to i__int
ENDFOR
SORT i__int from low to high
NI = number of elements of i__int
I=1
sum=0
WHILE I+1 <= NI
    A = element I of i__int
    B = element I+1 of i__int
    sum=sum+(B−A)*(prob__i(A, i__j__list)+prob__i(B,
    i__j__list))/2
    I=I+1
ENDWHILE
prob__i__av=sum /(i__max − i__min)
Return: prob__i__av
```

Function w_list(Sp_list): calculates and returns a list of parent weights

```
Sp__neg = second element of Sp__list
dp__list = a list with for each parent the difference
    P(S_H|Sp__neg_S+) − P(S_H|Sp__neg), specified in resp.
    740-743 and 730-733.
dm__list = a list with for each parent the difference
    P(S_L|Sp__neg) − P(S_L|Sp__neg_S+), specified in resp.
    740-743 and 730-733.
sum__p = sum of the elements of dp-list
sum__m = sum of the elements of dm__list
FOR each parent
    dp__c = value in dp__list for current parent
    dm__c = value in dm__list for current parent
    w__c = .5*(dp__c/sum__p) + .5*(dm__c/sum__m)
    add w__c to list of parent weights w__list
ENDFOR
Return: w__list
```

The function 'calculate_CPT' calculates all the probabilities of the CPT using the CPT and Sp_list from 720-723.

Function calculate_CPT(Sp_list, CPT)

```
i_j_list=i_j_list(Sp_list)
w_list=w_list(Sp_list)
FOR each combination of parent states Sp_c from the CPT
    i_i_list = a list of individual influence factors
        for the parent node states in Sp_c using
        Function i_i(S).
    i_j = i_j(Sp_c)
    NS = number of states of the variable
    prob = zero vector of length NS
    FOR each parent
        i_i = current parent individual influence
            factor from i_i_list
        w = current parent weight from w_list
        prob = prob + w*prob_i_av(i_i, i_j, i_j_list)
    ENDFOR
    STORE prob in CPT
ENDFOR
FOR each positive dominant parent
    Sp_pos = first element of Sp_list
    prob = retrieve the probabilities for the states
        conditional on Sp_pos from the CPT.
    FOR each combination of parent states Sp_c from the
        CPT
        IF the positive dominant parent has its
            highest state in Sp_c
                OVERWRITE the probabilities for this
                    condition in the CPT with
                    the probabilities
                    conditional on Sp_pos.
        ENDIF
    ENDFOR
ENDFOR
FOR each negative dominant parent
    Sp_neg = second element of Sp_list
    prob = retrieve the probabilities for the states
        conditional on Sp_neg from the CPT.
    FOR each combination of parent states Sp_c from the
        CPT
        IF the negative dominant parent has its
            lowest state in Sp_c
                OVERWRITE the probabilities for this
                    condition in the CPT with
                    the probabilities
                    conditional on Sp_neg.
        ENDIF
    ENDFOR
ENDFOR
```

It may be noted that this results in values of the conditional probabilities that lead to reliable decisions when the BBN is used, because the CPT is anchored on the typical probabilities specified at 520 and the remaining conditional probabilities are derived via interpolation. The linear interpolation described in this document ensures a coherent specification of probabilities for the full CPT, if the interpolation is performed between a set of coherent probabilities. For large CPTs one might even expect a far more coherent CPT using this algorithm than when all values would be specified one by one by an expert assessor.

Thus, the dependence on knowledge of experts to enter combined probabilities has been largely replaced by more complicated computations that do not depend on expertise, making it possible to shift more of the burden of determining the probabilities for use in a BBN decision support apparatus to a computer.

Finally, in step 550 the values of the CPT are overwritten with the values calculated at step 540.

Figure 8:
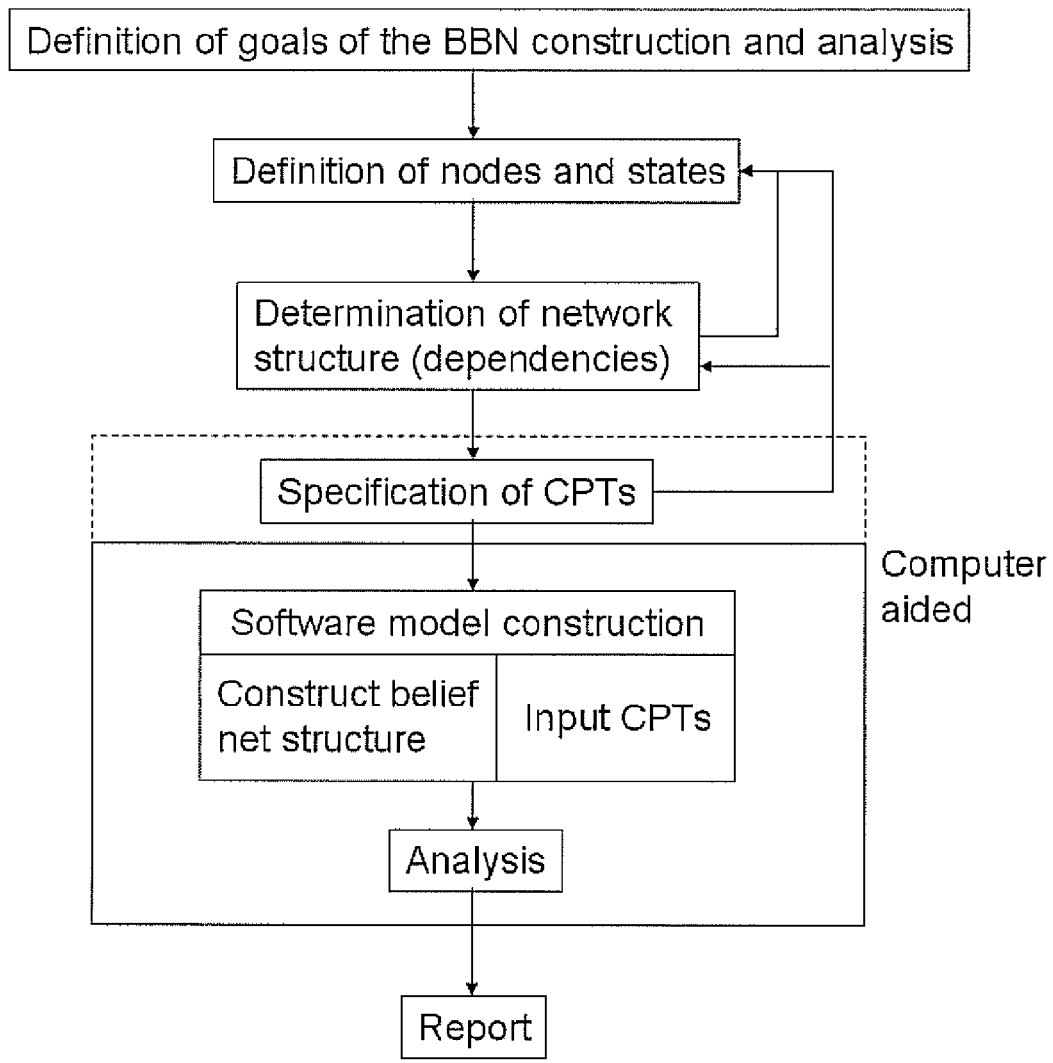
FIG. 8 shows an overview of BBN construction

FIG. 8 describes an overview of BBN construction comprising a first step wherein the goals of the BBN construction and analysis are defined. After the first step a second step is executed comprising definition of nodes and states. After the second step a third step is executed comprising determination of network structure (dependencies). After the third step a fourth step is executed comprising specification of CPTs. After the fourth step a fifth step is executed comprising software model construction, construct belief net structure and input CPTs. After the fifth step a sixth step is executed comprising analysis. After the sixth step a seventh step is executed comprising report.

It should be appreciated that various alternative implementations are possible. For example, non-linear interpolation may be used instead of the linear interpolation employed in the example. This includes adjusting the interpolation such that it can deal with synergetic effects between parent influences. A synergetic effect takes place when the joint influence of parent variables is not equal to the sum of their individual influences. Furthermore, the program may be modified to deal with (dis)agreement of influence of parent variables. Currently disagreement of parent node influences is dealt with by averaging the probabilities over the interval bounded by a parents individual influence factor and the joint influence factor. Furthermore, there are many alternatives for determining the parent weights, including e.g. taking equal weights for all parents.

REFERENCES

Druzdzel, M. J. & Van Der Gaag, L. C. (1995) Elicitation of probabilities for belief networks: combining qualitative and quantitative information. *Proceedings of the eleventh conference on uncertainty in artificial intelligence.*

Jensen, F. (2001) *Bayesian Networks and Decision Graphs (Information Science and Statistics)*, Springer.

Kim, J. & Pearl, J. (1983) A computational model for causal and diagnostic reasoning in inference engines. *8th International Joint Conference on Artificial Intelligence.* Karlsruhe, West Germany.

Tang, Z. & Mccabe, B. (2007) Developing complete conditional probability tables from fractional data for Bayesian belief networks *Journal of Computing in Civil Engineering,* 21, pp. 265-276.

Wisse, B. W., Gosliga, S. P. V., Elst, N. P. & Barros, A. I. (2008) Relieving the elicitation burden of Bayesian belief networks.

The invention claimed is:

1. A computer-implemented method for providing conditional probability data in a Bayesian Belief network based decision support apparatus, wherein the conditional probability data defines conditional probabilities of states values of a particular network node as a function of a vector of state values for a combination of parent nodes of the particular network node in the Bayesian Belief network, wherein at least one of the parent nodes has at least three possible state values, the computer implemented-method comprising receiving elicited conditional probability data defining the conditional probabilities of the state values of the particular network node for a subset of all possible instances of the vectors of combinations of state values of the parent nodes;

interpolating conditional probability data defining the conditional probabilities of the state values of the particular network node for further possible instances of the vectors of state values of the parent nodes from the elicited conditional probability data, using an interpolation function that interpolates between the elicited conditional probability data as a function of influence factors assigned to the further possible instances of the vectors;

receiving elicited data defining a ranking of state values of the at least one of the parent nodes, according to increasingly or decreasingly positive and/or negative influence of the state values of the at least one of the parent nodes on the state values of the particular node; and determining the influence factors for the possible instances of the vectors of state values for the combination of the parent nodes of the particular node as a function of the ranking of the state values of the at least one of the parent nodes in the possible instances of the vectors.

2. The method according to claim 1, wherein said receiving of the elicited conditional probability data comprises inputting, for each possible state value of the particular node, an elicited vector of state values of the parent nodes that results in a highest conditional probability of that state value of the particular node;

inputting, for each of the elicited vectors of state values of the parent nodes, first elicited conditional probability data defining the conditional probabilities of all state values of the particular node conditional on a particular vector of state values of its parent nodes, the method further comprising interpolating between the first elicited conditional probability data in said interpolation.

3. The method according to claim 1, wherein the particular network node has at least three possible state values, the method comprising performing said interpolating separately for conditional probability data for each of a plurality of state values of the particular network node.

4. The method according to claim 1, comprising computing the influence factors for the possible instances of the vectors of state values for the combination of the parent nodes of the particular node as joint influence factors, each joint influence factor combining contributions for individuals of the parent nodes in the possible instances of the vectors, as a function of the ranking of the state values of the individuals of the parent nodes.

5. The method according to claim 4, comprising computing the joint influence factors according to a sum of terms for the individuals of the parent nodes, wherein the term for each parent node is proportional to:

$$\mathrm{Rank}(x) - \mathrm{minRank}(X)$$

wherein Rank(x) is the rank assigned to the state value x of an individual of the parent nodes, and minRank(X) is the lowest rank assigned to any one of the state values of the individual of the parent nodes respectively.

6. The method according to claim 4, comprising computing the joint influence factors according to a sum of terms for the individuals of parent nodes, wherein the term for each parent node is proportional to:

$$\mathrm{Rank}(x) - \mathrm{minRank}(X)$$

$$\mathrm{maxRank}(X) - \mathrm{Rank}(x)$$

when an individual of the parent nodes has a positive and a negative influence on the state value of states of the particular network node respectively, wherein Rank(x) is the rank assigned to the state value x of the individual of the parent nodes, and minRank(X) and maxRank(X) are the lowest and highest rank assigned to any one of the state values of the individual of the parent nodes respectively.

7. The method according to claim 1, comprising computing the influence factors for the possible instances of the vectors of state values for the combination of the parent nodes of the particular node as individual influence factors, dependent on the vector only through the ranking of the state value of said at least one of the parent nodes.

8. The method according to claim 7, comprising computing the individual influence factors in proportion to:

$$\mathrm{Rank}(x) - \mathrm{minRank}(X)$$

wherein Rank(x) is the rank assigned to the state value x of an individual of the parent nodes, and minRank(X) is the lowest rank assigned to any one of the state values of the individual of the parent nodes respectively.

9. The method according to claim 7, comprising computing the individual influence factors in proportion to:

$$\mathrm{Rank}(x) - \mathrm{minRank}(X)$$

$$\mathrm{maxRank}(X) - \mathrm{Rank}(x)$$

when an individual of the parent nodes has a positive and a negative influence on the state value of states of the particular network node respectively, wherein Rank(x) is the rank assigned to the state value x of the respective one of the parent nodes, and minRank(X) and maxRank(X) are the lowest and highest rank assigned to any one of the state values of the individual of the parent nodes respectively.

10. The method according to claim 1, comprising computing a conditional probability from a range based average of interpolated conditional probabilities obtained for a range of influence factor values, between a joint influence factor value for the vector of state values of the parent nodes and an individual influence factor value for the state value of an individual of the parent nodes, wherein the joint influence factor is computed by combining contributions for individuals of the parent nodes in the vector, as a function of the ranking of the state values of the individuals of the parent nodes, and the individual influence factor is computed dependent on the vector only through the ranking of the state value of the individual of the parent nodes.

11. The method according to claim 10, comprising computing the conditional probability for the possible instances of the vectors from a further average of the range based averages of interpolated conditional probabilities for different individuals of the parent nodes.

12. The method according to claim 11, comprising receiving elicited information for each parent node about differences $|P(X=x|a_{neg,k+}) - P(X=x|a_{neg})|$ between the conditional probabilities of extreme state values "x" of the particular node when the vector has a least favorable value "$a_{neg}$" for a maximum state value of the particular node and when the vector has a value "$a_{neg,k+}$" wherein the state value of the parent node k has its most favorable value for the maximum value of the state value of the particular node and further parent nodes of the particular node have state values corresponding to the least favorable value "$a_{neg}$" of the vector;

computing said further average as a weighted average of the range based averages, wherein the range based averages for individuals of the parent nodes are each given weight in proportion to the elicited information about the difference between the conditional probabilities of the extreme state values "x" of the particular node.

13. The method according to claim 12, wherein the weights are computed in proportion to $$|P(x_{max}|a_{neg,k+}) - P(x_{max}|a_{neg})|/\mathrm{norm1} + (P(x_{min}|a_{neg}) - P(x_{min}|a_{neg,k+}))/\mathrm{norm2},$$

wherein xmax and xmin are the maximum state value of the particular node and a minimum state value of the particular node respectively and norm1 is twice the sum of $|P(x_{max}|a_{neg,k+})-P(x_{max}|a_{neg})|$) over the further parent nodes labelled by "k" and norm2 is twice the sum of $|P(x_{min}|a_{neg,k+})-P(x_{min}|a_{neg})|$)over the different parent nodes.

14. The method according to claim 1, comprising receiving elicited information indicating for each parent node of the particular node whether it is positively or negatively dominant over the particular node.

15. A non-transitory storage medium which has stored thereon an input module for a decision support apparatus, configured to receive conditional probability data for nodes of a Bayesian Belief network, configured to receive the conditional probability data according to a computer-implemented method for providing the conditional probability data in the decision support apparatus, wherein the conditional probability data defines conditional probabilities of states values of a particular network node as a function of a vector of state values for a combination of parent nodes of the particular network node in the Bayesian Belief network, wherein at least one of the parent nodes has at least three possible state values, the computer-implemented method comprising:
  receiving elicited conditional probability data defining the conditional probabilities of the state values of the particular network node for a subset of all possible instances of the vector of combinations of state values of the parent nodes;
  interpolating conditional probability data defining the conditional probabilities of the state values of the particular network node for further possible instances of the vector of state values of the parent nodes from the elicited conditional probability data, using interpolation function that interpolates between the elicited conditional probability data as a function of influence factors assigned to the further possible instances of the vector;
  receiving elicited data defining a ranking of state values of the at least one of the parent nodes, according to increasingly or decreasingly positive and/or negative influence of the state values of the at least one of the parent nodes on the state values of the particular node; and
  determining the influence factors for the possible instances of the vector of state values for the combination of the parent nodes of the particular node as a function of the ranking of the state values of the at least one of the parent nodes in the possible instances of the vector.

16. A decision support apparatus, comprising a non-transitory storage medium according to claim 15.

17. A non-transitory storage medium which has stored thereon a computer program, said program comprising a program of instructions for a programmable computer which, when executed by the programmable computer, cause the programmable computer to perform a computer-implemented method for providing conditional probability data in a Bayesian Belief network based decision support apparatus, wherein the conditional probability data defines conditional probabilities of states values of a particular network node as a function of a vector of state values for a combination of parent nodes of the particular network node in the Bayesian Belief network, wherein at least one of the parent nodes has at least three possible state values, the computer implemented-method comprising:
  receiving elicited conditional probability data defining the conditional probabilities of the state values of the particular network node for a subset of all possible instances of the vector of combinations of state values of the parent nodes;
  interpolating conditional probability data defining the conditional probabilities of the state values of the particular network node for further possible instances of the vector of state values of the parent nodes from the elicited conditional probability data, using interpolation function that interpolates between the elicited conditional probability data as a function of influence factors assigned to the further possible instances of the vector;
  receiving elicited data defining a ranking of state values of the at least one of the decreasingly positive and/or negative influence of the state values of the at least one of the parent nodes on the state values of the particular node; and
  determining the influence factors for the possible instances of the vector of state values for the combination of the parent nodes of the particular node as a function of the ranking of the state values of the at least one of the parent nodes in the possible instances of the vector.

* * * * *

UNITED STATES PATENT AND TRADEMARK OFFICE
CERTIFICATE OF CORRECTION

PATENT NO. : 8,606,741 B2  
APPLICATION NO. : 12/934951  
DATED : December 10, 2013  
INVENTOR(S) : Bram Willem Wisse Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 367 days.

Signed and Sealed this

Twenty-second Day of September, 2015

Michelle K. Lee
*Director of the United States Patent and Trademark Office*